United States Patent Office 3,711,475
Patented Jan. 16, 1973

3,711,475
2,3-DIHYDRO-1-OXA-4-THIA-3,5-DIAZIN-2-ONE-4,4-DIOXIDES
Hans Disselkotter, Cologne, Germany, assignor to Farbenfabriken Bayer Aktiengesellschaft, Leverkusen, Germany
No Drawing. Filed July 15, 1970, Ser. No. 55,248
Claims priority, application Germany, Aug. 8, 1969,
P 19 40 369.1
Int. Cl. C07d 93/24
U.S. Cl. 260—243 R  15 Claims

ABSTRACT OF THE DISCLOSURE

Heterocyclic compounds of the formula

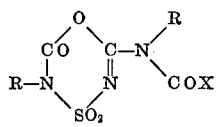

in which R represents an optionally substituted aliphatic, cycloaliphatic or araliphatic radical, and X represents halogen are obtained by reacting N-carbonyl sulphamic acid halides with an isocyanate RNCO in the presence of a halide of an element of Groups I–B, II–B, III–A, IV–A, IV–B or V–B of the Mendeleev Periodic Table, as catalyst, or in the presence of a substance which is at least partly converted into one of these halides in the reaction mixture, at a temperature of from −70 to +70° C.

The new compounds show herbicidal activity.

---

This invention relates to new heterocyclic compounds and to a process for their preparation in which an N-carbonyl sulphamic acid halide is reacted with an isocyanate generally in molar ratio of 1:2 in the presence of a halide of an element of the Groups I–B, II–B, III–A, IV–A, IV–B or V–B of the Periodic System, or in the presence of a substance which is converted at least partly into such a halide in the reaction mixture, optionally in the presence of a solvent, at a temperature of from about −70 to +70° C.

The isocyanates used in the process are known (Annalen 562, pages 75–136 (1969)).

The isocyanates used in the process preferably correspond to the general formula R—NCO, in which R represents an optionally substituted aliphatic or araliphatic radical. In the present context, aliphatic radicals are alkyl radicals preferably with from 1 to 24, and especially with from 1 to 12, carbon atoms; alkenyl radicals preferably with from 2 to 18, and especially with from 2 to 6, carbon atoms; and cycloalkyl radicals with preferably 5 or 6 carbon atoms in the ring system.

The araliphatic radicals contain 1 to 4, and preferably 1 or 2, carbon atoms in the aliphatic portion and up to 14 carbon atoms in the aromatic portion (preferably a phenyl radical).

Halogens (preferably fluorine, chlorine or bromine), lower alkoxy and carboalkoxy groups (preferably with 1 to 4 carbon atoms) are examples of substituents for the aforementioned aliphatic radicals and for the aromatic portion of the araliphatic radical.

The N-carbonyl sulphamic acid halide preferably used in the process is the chloride.

The new compounds correspond to the general formula

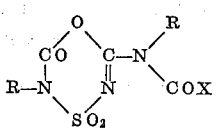

in which R is as defined above whilst X represents halogen.

The process is explained with reference to the following example:

$$OC=N-SO_2Cl + 2C_2H_5NCO \longrightarrow$$

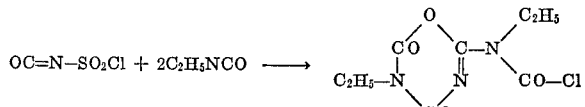

Catalysts used for the purpose of the invention include halides of the elements of groups I–B, II–B, III–A, IV–A, IV–B or V–B of the Mendeleev Periodic Table (K. A. and W. R. Hoffmann, Anorgan. Chemie 12. Auflage (1948)). The following are examples of such halides: $SnCl_2$, $SnCl_4$, $ZnCl_2$, $ZnBr_2$, $TiCl_4$, $CuCl$, $CuBr$, and $SbCl_5$; although it is also possible to use, as catalysts, organic compounds of the same elements, or organic salts thereof such as

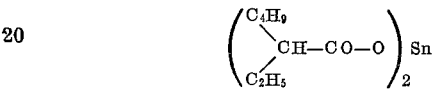

or metal powders, for example zinc powder, which are at least partly converted into halides in the reaction mixture. The catalysts are used preferably in quantities of from 0.01 to 10% and especially in quantities of from 0.1 to 5%.

Examples of suitable isocyanates include methyl, ethyl, n-propyl, allyl, n-butyl, n-dodecyl, hexadecyl, β-chloroethyl, methoxymethyl and cyclohexyl isocyanate.

Suitable solvents which may optionally be present during the reaction include those of the kind that do not react with the starting compounds, for example, hydrocarbons optionally substituted by halogen or nitro groups, ethers, esters, nitriles, sulphones, sulphonic acid esters or liquid sulphur dioxide.

In its simplest form, the process can be carried out at ambient pressure and at room temperature, or at temperatures slightly above room temperature, by mixing the reactants and the catalyst and dissipating the heat of reaction, although when a readily volatile solvent is used, the reaction may have to be carried out at lower temperatures or under pressure.

To carry out the process according to the invention, it has proved to be of advantage to carry out the reaction at a temperature of from about −20 to +50° C., and most preferably at a temperature of from +20 to +40° C. As a rule, the reaction is started at approximately room temperature, and the reaction temperature is subsequently kept at around 30 to 40° C. by cooling.

The reagents are normally employed in the stoichiometric proportions according to the reaction equation set out above, although it can also be of advantage, in special cases, to depart from this ratio. The order in which the reactants are added is generally not critical, although when a readily trimerising isocyanate is used, it can be of advantage to make it the last component added to the reaction mixture.

In many instances, the reaction products are substances which crystallise satisfactorily, and which can be isolated either by filtration under suction or by any other conventional method.

The new compounds can be used for further reactions, for example in the production of plant-protection agents, or may even be directly used as such.

Substances with herbicidal activity are obtained by acylating aromatic amines, for example anilines optionally substituted in the nucleus by halogen atoms and/or lower alkyl, S—alkyl, O—alkyl, CN or $NO_2$ groups, with the compounds prepared by the process according to the invention. For example, 127.8 g. of the adduct of 2 mols of methyl isocyanate and 1 mol of N-carbonyl sulphamic acid chloride, having the formula

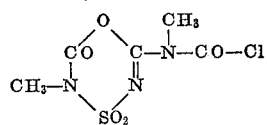

are dissolved in 1 litre of methylene chloride. A mixture of 46.6 g. of aniline and 39.6 g. of pyridine is then added dropwise with cooling at 5° C. After stirring for one and a half hours at 5 to 20° C., the pyridine hydrochloride formed is removed by washing with water. After drying with $Na_2SO_4$, followed by concentration through evaporation in vacuo of the methylene chloride, the solid residue comprises 147.6 g. (94%) of the compound

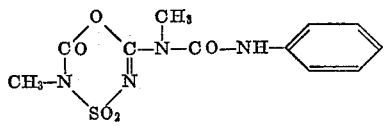

which melts at 118° C. after crystallisation from methylene chloride to which ether has been added.

As the following test shows, this compound can be used for selectively controlling weeds growing among cotton, wheat and maize.

PRE-EMERGENCE TEST solvent: 5 parts by weight of acetone
emulsifier: 1 part by weight of alkylaryl polyglycol ether (substituted phenol reacted with 11 mols of ethylene oxide).

To prepare a suitable active ingredient preparation, 1 part by weight of the active ingredient is mixed with the specified quantity of solvent, the specified quantity of emulsifier is added, and the concentrate is diluted with water to the required concentration.

Seeds of the test plants are sown in normal soil and after 24 hours are watered with the active ingredient preparation. The quantity of water per unit area is kept constant. The concentration of active ingredient in the preparation is not important, the critical factor being the quantity in which the active ingredient is applied per unit area. After three weeks, the extent of damage to the test plants is assessed and identified by the numbers 0 to 5 which have the following meaning:

0=no effect
1=slight damage or delay in growth
2=distinct damage or growth inhibited
3=serious damage and defective development (only 50% of the plants emerge)
4=plants partially killed after germination (only 25% emerge)
5=plants completely killed (no plants emerge).

The active ingredients used, the quantities in which they are applied and the test results are set out in the following table:

| Compound | Quantity,[1] kg./ha. | Echinochloa | Stellaria | Galinsoga | Matricaria | Cotton | Wheat | Maize |
|---|---|---|---|---|---|---|---|---|
| a | 40 | 5 | 5 | 5 | 5 | 4-5 | 4-5 | 3 |
|   | 10 | 5 | 5 | 5 | 5 | 0 | 1 | 0 |

[1] Active ingredient applied.

If, instead of compound $a$, other new compounds, which can be obtained in accordance with the invention are used for reaction with aniline or its derivatives, the anilines obtained show comparable herbicidal activity.

Example 1

3 ml. of $SnCl_4$ were added to a mixture of 425 g. (3 mols) of N-carbonyl sulphamic acid chloride and 342 g. (6 mols) of methyl isocyanate, and the mixture was kept at 20 to 30° C. by moderate cooling. After 12 hours, the mixture, which had solidified in the meantime, was finely powdered with ice-cold ethyl acetate, suction-filtered and dried. The adduct 6-(N-chlorocarbonyl-N-methyl)-amino-3 - methyl - 2,3 - dihydro-1-oxa-4-thia-3,5-diazin-2-one-4,4-dioxide.

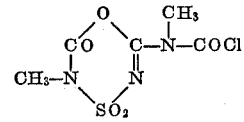

was obtained in a yield of 632 g. (82%), M.P. 106–108° C. The compound was identified by combustion analysis, spectra and reactions.

Examples 2 to 12

Several samples each of 10 ml. were taken from a mixture of 141.5 g. (1 mol) of N-carbonyl sulphamic acid chloride and 114.1 g. (2 mols) of methyl isocyanate. Different catalysts were added to the samples.

The results obtained are set out in the following table:

| Example number | Catalyst | Crystallisation after, hours |
|---|---|---|
| 2 | 0.2 g. $ZnCl_2$ | 0.25 |
| 3 | 0.2 g. $SnCl_2$ | 0.5 |
| 4 | 0.2 ml. $SnCl_4$ | 3 |
| 5 | 0.2 ml. $TiCl_4$ | 15 |
| 6 | 0.2 g. $HgCl_2$ | 15 |
| 7 | 0.2 g. CuCl | |
| 8 | 0.2 g. CuBr | |
| 9 | 0.2 ml. $SbCl_5$ | |
| 10 | 0.2 g. $ZnBr_2$ | 0.2 |
| 11 | 0.2 ml. $\left( \begin{array}{c} C_2H_5 \\ CH-COO \\ C_4H_9 \end{array} \right)_2 Sn$ | 4 |
| 12 | Blank test without catalyst | |

All the crystallised products were identical with the product obtained in accordance with Example 1. It was possible to detect the presence of a considerable quantity of the same product in the oily reaction products obtained in accordance with Examples 7 to 9 through the appearance of an infra-red absorption band at 1630 cm.[1] which is characteristic of the new heterocyclic compounds.

Example 13

A mixture of 14.15 g. (0.1 mol) of N-carbonyl sulphamic acid chloride, 11.4 g. (0.2 mol) of methyl isocyanate and 7 mg. of zinc chloride crystallised almost completely during storage for 15 hours at 25° C. The crystals obtained were identical with those obtained in accordance with Example 1.

Example 14

A mixture of 141.5 g. (1 mol) of N-carbonyl sulphamic acid chloride, 114.1 g. (2 mols) of methyl isocyanate, 400 ml. of ethyl acetate and 2 ml. of $SnCl_4$ was cooled to −10° C. and suction filtered after standing for 3 days at 20° C. A crystalline product identical with that obtained in accordance with Example 1 was obtained in a yield of 130 g. (51%).

Example 15

A mixture of 141.5 g. (1 mol) of N-carbonyl sulphamic acid chloride and 142.2 g. (2 mols) of ethyl isocyanate was kept at 20 to 30° C. for 24 hours following the addition of 1 ml. of SnCl$_4$. The solidified crude product was crystallised from methylene chloride to which ether had been added. Yield 181 g. (64%), M.P. 77–78° C.

The analytical data confirm the structure

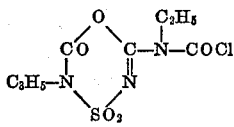

of 6 - (N - chlorocarbonyl-N-ethyl)-amino-3-ethyl-2,3-dihydro-1-oxa-4-thia-3,5-diazin-2-one-4,4-dioxide.

Example 16

6 - (N - chlorocarbonyl-N-n-propyl)-amino-3-n-propyl-2,3-dihydro-1-oxa-4-thia-3,5-diazin-2-one-4,4-dioxide.

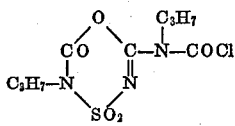

was obtained by keeping a mixture of 70.8 g. (0.5 mol) of N-carbonyl sulphamic acid chloride, 85.1 g. (1 mol) of n-propyl isocyanate and 0.5 ml. of SnCl$_4$ at a temperature of 20 to 30° C. for a period of 5 days. This adduct shows the characteristic band at 1620 cm.$^{-1}$ in the infra-red spectrum.

Example 17

6-(N-chlorocarbonyl - N - n-butyl)-amino-3-n-butyl-2,3-dihydro-1-oxa-4-thia-3,5-diazin-2-one-4,4-dioxide

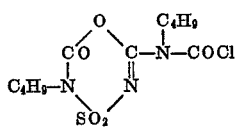

was obtained following the technique set out in Example 16 by keeping a mixture of 28.3 g. (0.2 mol) of N-carbonyl sulphamic acid chloride, 39.7 g. (0.4 mol) of n-butyl isocyanate and 0.2 ml. of SnCl$_4$ at a temperature of 25° C. for a period of five days. This adduct shows the characteristic band at 1620 cm.$^{-1}$ in the infra-red spectrum.

Example 18

6-(N - chlorocarbonyl-N-n-dodecyl) - amino-3-n-dodecyl - 2,3 - dihydro-1-oxa-4-thia - 3,5-diazin-2-one-4,4-dioxide

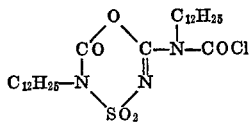

was obtained following the technique set out in Example 16 from 28.3 g. (0.2 mol) of N-carbonyl sulphamic acid chloride, 84.5 g. (0.4 mol) of n-dodecyl isocyanate and 0.5 ml. of SnCl$_4$. It shows the characteristic band at 1620 cm.$^{-1}$ in the infra-red spectrum.

Example 19

A mixture of 28.3 g. (0.2 mol) of N-carbonyl sulphamic acid chloride, 107.0 g. (0.4 mol) of n-hexadecyl isocyanate and 0.3 ml. of SnCl$_4$ was left standing at 20 to 30° C. Spontaneous crystallisation occurred after 5 days. After crystallisation from petroleum ether, the adduct obtained melted at 51 to 52° C. Analyses and spectra confirm the structure of the product 6-(N-chlorocarbonyl-N-n-hexadecyl) - amino - 3 - n - hexadecyl-2,3-dihydro-1-oxa-4-thia-3,5-diazin-2-one-4,4-dioxide

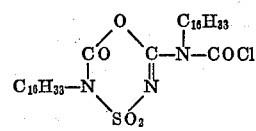

Example 20

6-(N-chlorocarbonyl-N-$\beta$-chloroethyl) - amino - 3 - $\beta$-chloroethyl - 2,3 - dihydro-1-oxa-4-thia-3,5diazin-2-one-4,4-dioxide

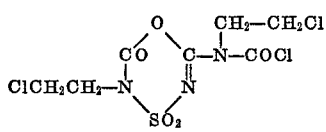

was obtained following the technique set out in Example 16 from 14.1 g. of N-carbonyl sulphamic acid chloride, 21.1 g. of $\beta$-chloroethyl isocyanate and 0.3 ml. of SnCl$_4$. In addition to analyses, this adduct was also identified by an infra-red band at 1620 cm.$^{-1}$.

Example 21

6-(N-chlorocarbonyl - N - allyl)-amino-3-allyl-2,3-dihydro-1-oxa-4-thia-3,5-diazin-2-one-4,4-dioxide
was obtained following the technique set out in Example 16 from 14.1 g. of N-carbonyl sulphamic acid chloride, 16.6 g. of allyl isocyanate and 0.2 ml. of SnCl$_4$. This

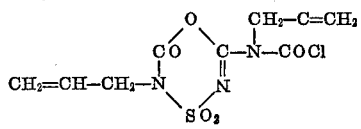

adduct was identified by its analyses and by an infra-red band at 1620 cm.$^{-1}$.

Example 22

6-(N - chlorocarbonyl - N - cyclohexyl)-amino-3-cyclohexyl-2,3 - dihydro - 1 - oxa-4-thia-3,5-diazin-2-one-4,4-dioxide

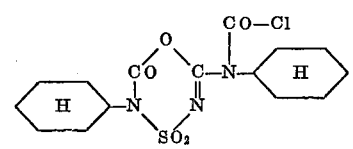

was obtained following the technique set out in Example 16 from 14.1 g. of N-carbonyl sulphamic acid chloride, 25.0 g. of cyclohexyl isocyanate and 0.2 ml. of SnCl$_4$. This adduct was identified by its analyses and by an infra-red band at 1630 cm.$^{-1}$.

What I claim is:
1. A compound corresponding to the formula

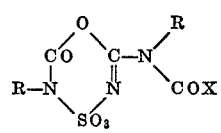

wherein R represents an alkyl radical having 1 to 24 carbon atoms, an alkenyl radical having from 2 to 6 carbon atoms, a cycloalkyl radical having 5 or 6 carbon atoms, or an araliphatic radical having 1 to 4 carbon atoms in the aliphatic portion and with phenyl as the aromatic ring, said aliphatic and araliphatic radicals being substituted by a member selected from the group consisting of halogen, lower alkoxy and lower carboalkoxy groups, and X represents halogen.

2. 6-(N-chlorocarbonyl - N - methyl)-amino-3-methyl-2,3-dihydro - 1 - oxa-4-thia-3,5-diazin-2-one-4,4-dioxide.

3. 6-(N-chlorocarbonyl - N - ethyl)-amino-3-ethyl-2,3-dihydro-1-oxa-4-thia-3,5-diazin-2-one-4,4-dioxide.

4. 6-(N-chlorocarbonyl - N - n-propyl)-amino-3-n-propyl-2,3-dihydro-1-oxa-4-thia-3,5-diazin-2-one-4,4-dioxide.

5. 6-(N-chlorocarbonyl - N - n-butyl)-amino-3-n-butyl-2,3-dihydro-1-oxa-4-thia-3,5-diazin-2-one-4,4-dioxide.

6. 6-(N-chlorocarbonyl - N - n-dodecyl)-amino-3-n-dodecyl-2,3-dihydro-1-oxa-4-thia-3,5 - diazin - 2 - one-4,4-dioxide.

7. 6-(N - chlorocarbonyl - N - n-hexadecyl)-amino-3-n-hexadecyl-2,3-dihydro - 1 - oxa-4-thia-3,5-diazin-2-one-4,4-dioxide.

8. 6-(N-chlorocarbonyl - N - β-chloroethyl)-amino-3-β-chloroethyl - 2,3 - dihydro - 1 - oxa-4-thia-3,5-diazin-2-one-4,4-dioxide.

9. 6-(N-chlorocarbonyl - N - allyl) - amino-3-allyl-2,3-dihydro-1-oxa-4-thia-3,5-diazin-2-one-4,4-dioxide.

10. 6-(N-chlorocarbonyl - N - cyclohexyl)-amino-3-cyclohexyl - 2,3 - dihydro-1-oxa-4-thia-3,5-diazin-2-one-4,4-dioxide.

11. A process for the production of the compound of claim 1, wherein an N-carbonyl sulphamic acid halide is reacted with an isocyanate having the formula R—NCO, in which R is an alkyl radical containing between 1 and 24 carbon atoms, or an alkenyl radical having between 2 and 6 carbon atoms, a cycloalkyl radical with 5 or 6 carbon atoms or an araliphatic radical containing 1 to 4 carbon atoms in the aliphatic portion and having a phenyl radical as the aromatic ring, said aliphatic and araliphatic radicals being selected from the group consisting of halogen, lower alkoxy and lower carboalkoxy groups, in the presence of a halide of an element of Groups N, I–B, II–B, III–A, IV–A, IV–B or V–B of the Mendeleev Periodic Table, as catalyst, at a temperature of from —70 to +70° C.

12. Processes claimed in claim 11, wherein the isocyanate has the formula R—NCO, in which R represents a substituted aliphatic or araliphatic radical.

13. Process as claimed in claim 11, wherein the catalyst is a halide of tin, zinc, titanium or mercury.

14. Process as claimed in claim 11, wherein the catalyst is used in an amount of from 0.01 to 10%.

15. Processes according to claim 11, wherein the isocyanate is methyl, ethyl, n-propyl, allyl, n-butyl, n-dodecyl, hexadecyl, β-chloroethyl, methoxymethyl or cyclohexyl isocyanate.

References Cited
UNITED STATES PATENTS

| | | | |
|---|---|---|---|
| 3,227,713 | 1/1966 | Behner et al. | 260—243 |
| 3,314,949 | 4/1967 | Wei et al. | 260—243 |

JOHN M. FORD, Primary Examiner

U.S. Cl. X.R.

71—91

UNITED STATES PATENT OFFICE
CERTIFICATE OF CORRECTION

Patent No. 3,711,475    Dated January 16, 1973

Inventor(s) Hans Disselkötter

It is certified that error appears in the above-identified patent and that said Letters Patent are hereby corrected as shown below:

Column 4, line 49, "1630 cm'" should read --$1630^{-1}$--

Column 5, line 12, 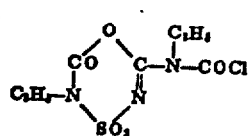 should read

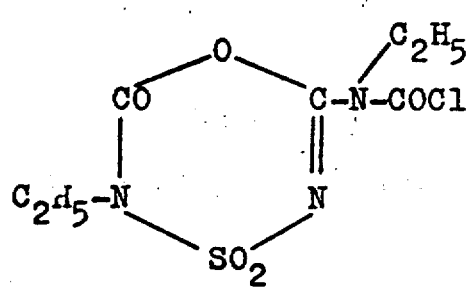

Column 6, the formula at lines 30-35 should be deleted and the formula should be inserted at line 26, following "4,4-dioxide"

Column 6, Claim 1, line 60, 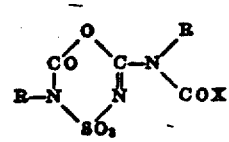 should read

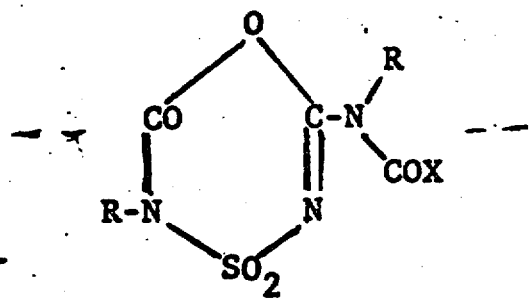

Signed and sealed this 29th day of May 1973.

(SEAL)
Attest:

UNITED STATES PATENT OFFICE
CERTIFICATE OF CORRECTION

Patent No. 3,711,475         Dated January 16, 1973

Inventor(s) Hans Disselkötter

It is certified that error appears in the above-identified patent and that said Letters Patent are hereby corrected as shown below:

Column 4, line 49, "1630 cm " should read -- 1630 cm$^{-1}$ --.

Column 5, line 12, 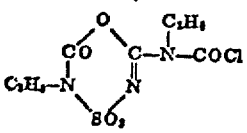 should read

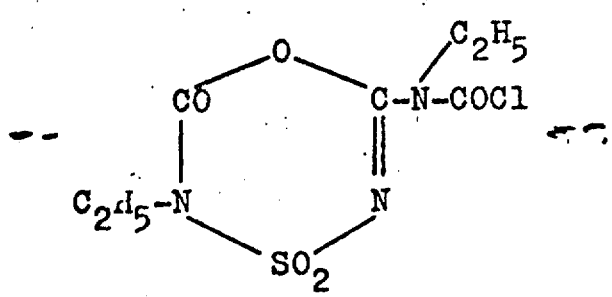

UNITED STATES PATENT OFFICE
CERTIFICATE OF CORRECTION

Patent No. 3,711,475         Dated January 16, 1973

Inventor(s)    Hans Disselkötter            Page - 2

It is certified that error appears in the above-identified patent and that said Letters Patent are hereby corrected as shown below:

Column 6, the formula at lines 30-35 should be deleted and the formula should be inserted at line 26, following "4,4-dioxide"

Column 6, Claim 1, line 60, 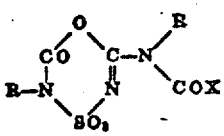 should read

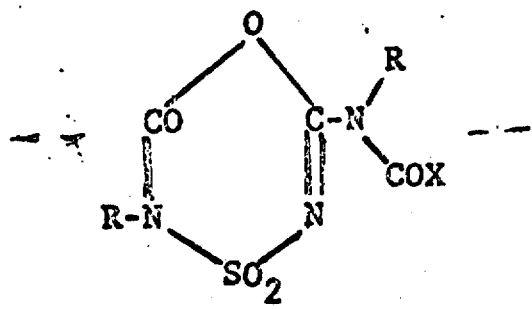

This certificate supersedes Certificate of Correction issued May 29, 1973.

Signed and sealed this 9th day of July 1974.

(SEAL)
Attest:

McCOY M. GIBSON JR.
Attesting Officer

C. MARSHALL DANN
Commissioner of Patents